United States Patent [19]
Hansen

[11] 3,899,414
[45] Aug. 12, 1975

[54] DRILLING MUD SEPARATION SYSTEM

[75] Inventor: Leslie T. Hansen, Lakewood, Calif.

[73] Assignee: Sweco, Inc., Los Angeles, Calif.

[22] Filed: Mar. 16, 1973

[21] Appl. No.: 341,942

[52] U.S. Cl. .................. 209/17; 209/254; 209/315; 175/206
[51] Int. Cl. ............................................. B04c 9/00
[58] Field of Search ....... 209/17, 12, 211, 254, 315, 209/323, 332, 322, 243, 244, 246; 210/297, 319, 314, 335, 339, 512; 175/66, 206, 207

[56] References Cited
UNITED STATES PATENTS

| | | | |
|---|---|---|---|
| 2,012,196 | 8/1935 | Lewis | 210/339 |
| 2,066,364 | 1/1937 | Rafton | 209/332 X |
| 2,703,648 | 3/1955 | Stucheli | 209/254 |
| 2,777,578 | 1/1957 | Miller et al. | 209/315 X |
| 2,923,151 | 2/1960 | Engle et al. | 209/211 X |
| 3,237,777 | 3/1966 | Brown et al. | 209/211 X |
| 3,570,670 | 3/1971 | Endo et al. | 210/297 X |
| 3,766,997 | 10/1973 | Heilhecker et al. | 175/66 |

FOREIGN PATENTS OR APPLICATIONS
613,694  12/1960  Italy .................................. 209/322

Primary Examiner—Frank W. Lutter
Assistant Examiner—Ralph J. Hill
Attorney, Agent, or Firm—Lyon & Lyon

[57] ABSTRACT

A vibratory screen separator having an arcuate plate which receives sediment from a plurality of hydrocyclones and distributes that sediment to the separator screen. The arcuate plate collects the sediment from a plurality of discharge positions and presents it to a centrally positioned outlet where it can fall onto the separator screen. The arcuate plate is itself positioned on the vibratory screen separator and is caused to vibrate therewith. The arcuate plate in combination with a grate over the centrally positioned outlet, also provides a cover for the separator to prevent large objects from damaging the screen. A hoist system is provided which can remove the plate for service and replacement of the screen.

3 Claims, 2 Drawing Figures

DRILLING MUD SEPARATION SYSTEM

This invention relates to vibratory drilling mud separating systems. More specifically, this invention is directed to an improved means for collecting and redistributing sediment from a plurality of hydrocyclones to a vibratory screen separator. This means also provides a cover for the screen.

Hydrocyclones have been employed to mechanically treat drilling mud to remove drilled solids therefrom. The hydrocyclones allow cleaned drilling mud to be separated upward from the drilled solids. Heavier and larger particles are caused to separate from the lighter and smaller particles in the drilling mud as a sediment in the hydrocyclones and discharge through the sediment outlet. Conventionally, the hydrocyclones have been employed only for the processing of drilling muds which are not chemically weighted because the hydrocyclones separate the valuable chemical weighting constituents of weighted drilling muds and direct them downward with the drilled solids.

More recently weighted mud systems have employed hydrocyclones by providing a manifold which collects the sediment from the hydrocyclones. These drilled solids and weighted materials are then transported from the collection manifold to a distributor which in turn causes the sediment to be directed onto a screen separator system.

Vibratory screen separators have been employed for separating drilled solids from the valuable weighting constituents in the hydrocyclone sediment. These separators generally have horizontally disposed screens mounted above a collecting plate. The system is caused to vibrate by eccentrically mounted weights on a motor. The drilled solids which collect above the horizontal screen are drawn off through an outlet located about the periphery of the screen. These separators are capable of separating the chemical weighting materials from the drilled solids which are not separated by the hydrocyclones.

These heretofore employed combined hydrocyclone and vibratory separator systems have required separate manifold systems for collecting the various output streams from the plurality of hydrocyclones. This manifold system has been separate from the hydrocyclones and the vibratory separator system. As a result, a much larger separation unit has been required. The manifold required special design to prevent premature settling of the hydrocyclone sediment before it could again be distributed through another system to the vibratory screen separator. The separator also had to be a complete unit including a cover adapted to receive influent from the second distribution system.

The present system incorporates a plurality of hydrocyclones in combination with a vibratory screen separator to provide a separation of the drilled solids from the drilling mud without loss of chemical weighting materials. The hydrocyclones are positioned directly above the vibratory separator and are caused to discharge directly onto an arcuate plate which forms the upper cover of the vibratory separator. Therefore, a principle object of the present invention is to provide a means for collecting and redistributing sediment from a plurality of hydrocyclones to a vibratory screen separator.

The arcuate plate directs the sediment from the hydrocyclones to a central outlet for distribution onto the center of the separator screen. By distributing the solids to the center of the separator screen, a vibratory action may be employed which causes the sediment on the separator screen to move outward from the center of the screen to a peripheral outlet. By directing the flow of the sediment on the separator screen outwardly from the center of the unit, the overall efficiency of the separator is increased. Thus, a second object of the present invention is to provide a vibratory system employing a plurality of hydrocyclones where the sediment therefrom is distributed to the center of a separator screen in a vibratory screen separator.

The screens demanded in the screening of chemical weighting materials from drilled solids must have a fine mesh size to be effective. These screens are relatively expensive and it is imperative for an economic mud cleaning system that these screens be protected from excessive wear and damage. The arcuate plate provided by the present invention acts as a cover means for the separator screen. Further, the central outlet can include a grate or screen or be otherwise restricted to prevent objects over a certain size from reaching the separator screen structure. Thus, another object of the present invention is to provide a distribution means which also acts as a cover for a vibratory screen separator.

The arcuate plate is positioned directly above the screen assembly. Further, the plate is fixed in a distributor housing which acts to contain the material received by the arcuate plate and mounts the entire receiver system onto the cylindrical housing. This total reciever assembly may be easily raised from the screen assembly using a hoist conveniently mounted to the frame of the system. This allows for easy cleaning and replacement of the screen assembly. Consequently, a further object of the present invention is to provide a sediment receiver system which can be easily separated from the separator system for service of the system.

By employing the arcuate plate as a collection system for the sediment from the hydrocyclones, a distributor of this sediment to an optimum position on the separator screen system and a cover to the separator, the overall height of the system can be greatly reduced over conventional systems incorporating collection manifolds separate for the vibrator assembly. The present device allows the hydrocyclone assembly to be lowered to within a few inches of the separators. Thus, an object of the present invention is to reduce the size of such hydrocyclones and vibratory separator systems. Also, by eliminating the separate manifold, the problem of settling between the hydrocyclones and the vibratory separator is eliminated. The arcuate plate is caused to vibrate with the separator screen which helps prevent premature settling of the sediment from the hydrocyclones and thereby provides another advantage.

Further objects and advantages will become apparent from the description herein.

Figure 1:
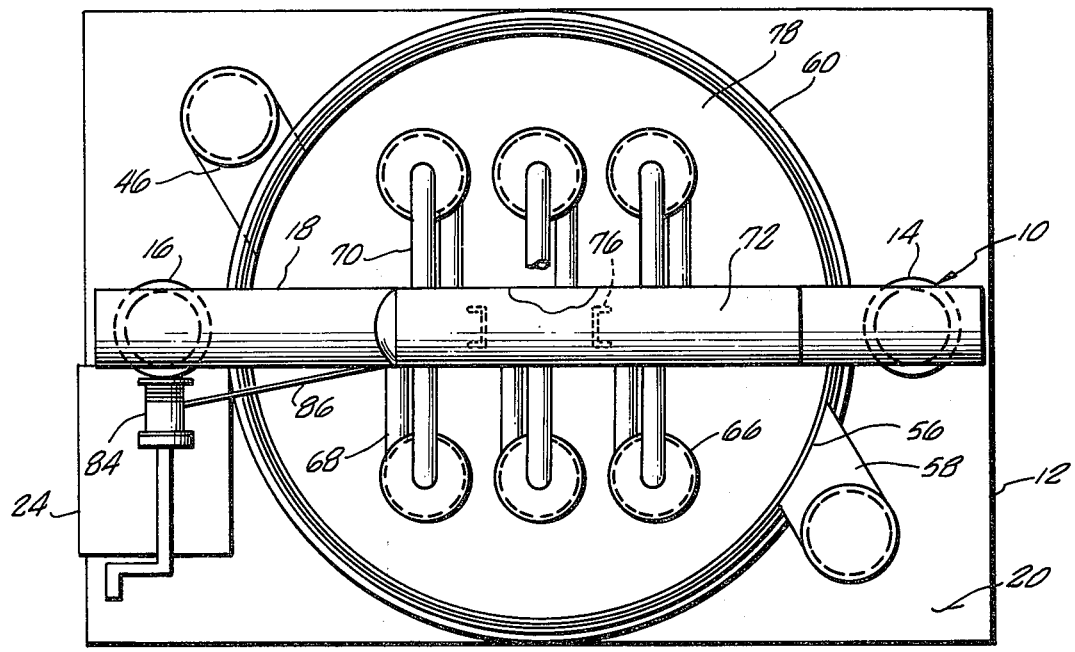
FIG. 1 is a top view of the drilling mud separation system.
Figure 2:
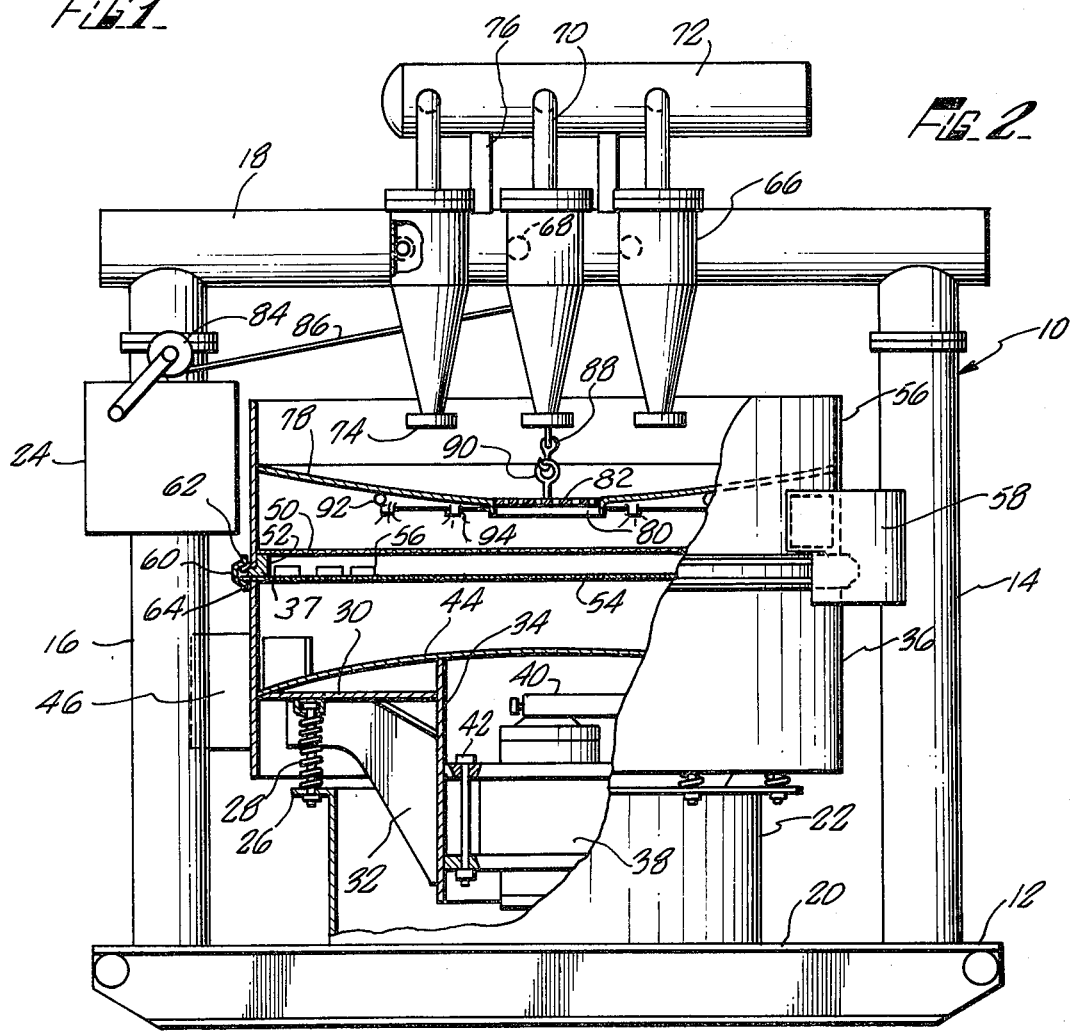
FIG. 2 is a side view of the drilling mud separation system having a portion of the housing removed from the separator for clarity.

Turning now to the drawings, a frame generally designated 10 is provided for transporting as well as structurally supporting the drilling mud separation system. The frame 10 includes a sled 12, columns 14 and 16, and a horizontal cross member 18. The sled 12 is of conventional design having a mounting plate 20 to which is attached the columns 14 and 16 and a circular base 22 for the vibratory screen separator. A control housing 24 is mounted to the columns 16.

The vibratory separator rests on the cylindrical base 22. The cylindrical base 22 has an annular ring 26 for mounting springs 28. The springs 28 are attached at their upper end to an annular support ring 30. In this manner, the separator is resiliently mounted to the cylindrical base 22. Gussets 32 are rigidly fixed to the annular support ring 30 at their upper edge. A cylindrical motor housing 34 is positioned through the center of the annular support ring 30 and is also attached to the gussets 32. A cylindrical housing 36 is positioned about the annular support ring 30 and is also rigidly fixed thereto. The gussets 32 further support this cylindrical housing 36. A motor 38 has eccentrically mounted weights 40 both above and below the motor 38 on the motor shaft. The motor 38 is mounted to the cylindrical motor housing 34 by mounting brackets 42. As the motor 38 drives the eccentric weights 40, the entire housing is set into vibration through the motor housing 34, the gussets 32, the annular ring 30 and the housing 36.

The housing 36 provides a chamber within which screened sediment can be collected. A discharge dome 44 slopes downward in a radial direction from the center of the separator to the cylindrical housing 36 to cause the screened sediment to flow radially to the housing 36. An outlet 46 is provided at one point along the periphery of the discharge dome 44 through the housing 36 to collect and exhaust the screened sediment.

Located directly above the discharge dome 44 is a self-cleaning screen assembly comprising an upper screen 50 which has a mesh size that is fine enough to prevent passage of the drilled solids in the hydrocyclone sediment. The proper mesh size must be determined for each application. The separator screen 50 extends across the cross section of the separator to a circular frame member 52 which keeps the screen 50 in constant tension. A plate 54 also extends across the cross section of the separator. The plate 54 is perforated to allow passage of all of the sediment which is able to pass through the separator screen 50. These sliders 56 act to keep the screen 50 clean. The eccentrically mounted weights 40 cause the overall separator to vibrate about its center of mass. This vibration may be controlled by the angular position of the upper weight 40 with respect to the lower weight 40 in order that a spiraling action of the unscreened particles on the screen 50 will be accomplished. This spiraling action initiates from the center of the screen 50 and moves in a curved path outward to the outer periphery of the screen 50. By distributing influent to the center of the screen 50, the spiraling action can be used to best advantage. The influent thereby flows outward on the screen 50 until it reaches the periphery where it circles until it approaches outlet 46. This provides a highly efficient operation of the vibrator.

A cylindrical distributor housing 56 provides containment for the screened particles which have been driven by the vibratory motion outward to the periphery of the screen 50. An outlet 58 allows the unscreened particles to exhaust from the unit. The distributor housing 56 is attached with the self-cleaning screen assembly to the cylindrical housing 36 by means of a band 60. A flange 62 extends outward from the base of the distributor housing 56 to interlock with the bank 60. A similar flange 64 extends outward about the top of the cylindrical housing 36. The self-cleaning screen assembly provides an anchoring ring 37 which extends past the inner diameters of both the cylindrical housing 36 and the distributor housing 56 and is sandwiched therebetween. The band 60 then clamps the entire structure together.

Influent is provided to the vibratory separator through a plurality of hydrocyclones 66. The number of hydrocyclones employed may vary with the relative capacities of the hydrocyclones and the vibratory separator. It has been found that as many as 10 hydrocyclones may be used with a single separator. Six are shown in the accompanying drawings. Hydrocyclones operate on a principle of centrifugal force to separate the larger and heavier solids from the relatively lighter and smaller solids and liquids in the mud creating a sediment. An angular velocity is given to the drilling mud influent by forcing it under pressure through the tangentially positioned inlets 68. The drilling mud introduced into the hydrocyclones 66 is thereby caused to be driven about the interior of the hydrocyclone 66. The heavier and larger particles migrate to the wall of the hydrocyclones 66 thereby pushing the lighter liquid and smaller particles inward. As more influent is driven into the hydrocyclones 66, the lighter particles are lifted through the upper outlet 70 to the cleaned drilling mud receiving manifold 72. The sediment moves down the inner wall of the hydrocyclones 66 and exhausts through the lower ports 74 thereof. The cross support member 18 of the frame 10 acts as a manifold to distribute influent to the tangential inlets 68 as well as provide structural support to the frame 10. The cleaned drilling mud manifold 72 is mounted to the cross member 18 on mounts 76.

Means are provided for collecting the sediment which exhausts through the lower ports 74 of the hydrocyclones 66. This means receives the sediment directly from the various hydrocyclones 66 and directs that sediment for distribution to the center of the separator screen 50. An arcuate plate 78 provides this collection means. The arcuate plate 78 extends across the cross-section of the distributor housing 56 and is welded to the inner wall thereof. The arcuate plate 78 is lower at the center to allow the sediment from the lower ports 74 of the hydrocyclones 66 to flow toward the center of the separator. The plate 78 is positioned a distance above the bottom edge of the distributor housing 56 so that the center of the plate 78 will remain spaced from the separator screen 50 in order that the collected sediment can flow downward on to the separator screen 50 and move outward on the screen 50 without being obstructed by the plate 78. Further, the dome is positioned a distance from the upper edge of the distributor housing 56 in order that the sediment from the lower ports 74 of the hydrocyclones 66 will not flow over the edge of the separator rather than be processed therethrough.

The arcuate plate 78 is provided a few inches away from the ports 74 of the hydrocyclones 66. This positioning is preferred because it allows unobstructed flow of the sediment from the ports 74. Further, the distributor housing 56 may be raised a short distance from the cylindrical housing 36 without dismantling the hydrocyclone assembly to change or service the self-cleaning screen assembly. This positioning of the hydrocyclones 66 near the plate 78 permits the entire separating system to be significantly reduced in height over other similar systems. The arcuate plate configuration allows the hydrocyclone system to be placed substantially at a point where it would otherwise be placed if no collecting system were employed. Yet, a collection means is provided which is capable of advantageously directing sediment to the center of the screen 50.

By making the arcuate plate 78 rigidly fixed to the housing of the vibrator separator, another advantage results. The plate 78 is caused to vibrate. This vibration tends to keep the particles in the sediment agitated so that they will not settle out and build up on the plate 78. Other systems having separate collection units require in many applications that a V-bottom be employed with steep sides to insure that the sediment will continue to flow toward the outlet. A relatively shallow drainage slope on the plate 78 may be employed with the present device because of the vibratory cleaning action.

A central outlet 80 is provided through the center of the arcuate plate 78 to allow passage of the sediment therethrough. This outlet 80 must be sized to allow passage of the quantity of sediment which can be supplied thereto by the plurality of hydrocyclones 66 which are employed. A grate 82 may be positioned across the outlets 80 to prevent large objects from falling onto the screen 50. Naturally, the total passage area of the outlet 80 excluding the solid portion of the grate 82 must be sufficient to accommodate the quantity of flow of sediment supplied by hydrocyclones 66.

A hoist 84 is employed with a cable 86 to allow the convenient lifting of the distributor housing 56 and arcuate plate 78 for the service or replacement of the screen 50. A hook 88 is positioned at the end of the cable 86 to engage eye 90. Eye 90 is fixed to the grate 82 and is capable of carrying the weight of the distribution system. To lift the distributor housing 56, the band 60 must be removed.

To insure trouble-free operation of the separator screen 50, a spray system is employed for washing the screen. A circular pipe 92 having nozzles 94 spaced about its length is fixed to the underside of the plate 78. A flexible coupling is preferred to feed the pipe 92 in order that the raising of the plate 78 will not be hampered by the inflow pipe to the circular pipe 92 and so that the feed pipe will not dampen the action of the vibratory screen separator.

Thus, a compact, easily cleaned, drilling mud separation system is disclosed which provides a novel combination of hydrocyclones with a vibratory screen separator including an arcuate plate for collecting and redistributing the sediment from the hydrocyclones to an optimum position on the separator screen of the vibratory separator.

While embodiments and applications of this invention have been shown and described, it would be apparent to those skilled in the art that many more modifications are possible without departing from the inventive concepts herein described. The invention therefore is not to be restricted except as is necessary by the prior art and by the spirit of the appended claims.

What is claimed is:

1. A separation system for separating drilled solids from drilling mud comprising
   a frame;
   an influent manifold fixed to said frame for receiving drilled solids-containing influent;
   a plurality of hydrocyclones coupled to said manifold for receiving influent therefrom and separating that influent into a sediment which is exhausted downward from said plurality of hydrocyclones and a cleaned drilling mud effluent directed upward from said plurality of hydrocyclones;
   a vibratory screen separator mounted on said frame below said hydrocyclones, said vibratory separator including a base, fixed to said frame, a housing resiliently mounted on said base, driving means for vibrating said separator, screen means for separating the sediment into a screened effluent of chemical additives and a concentrate of drilled solids, a sediment receiver comprising an arcuate plate mounted to said housing directly below said plurality of hydrocyclones and above said screen means for receiving the sediment from said hydrocyclones and directing it to a central position on said receiver, receiver outlet means for directing the sediment from the central position on said receiver to a central position on said screen means, said receiver outlet means including a passageway through said sediment receiver at the central position on said receiver and a grate means positioned within said passageway for preventing the passage of large objects through said passageway.

2. The separator of claim 1 wherein said driving means includes a system of eccentrically mounted weights which are rotated to provide a spiral flow pattern of the sediment.

3. The separator of claim 1 wherein
   said screen means includes a horizontal screen.

* * * * *